United States Patent [19]

Soot

[11] 4,296,736
[45] Oct. 27, 1981

[54] FOLDED PLATE SOLAR ENERGY COLLECTOR

[76] Inventor: Olaf Soot, 9 Tomahawk La., Greenwich, Conn. 06830

[21] Appl. No.: 100,016

[22] Filed: Dec. 3, 1979

[51] Int. Cl.³ .............................................. F24J 3/02
[52] U.S. Cl. ................................... 126/438; 126/447; 126/450
[58] Field of Search ............... 126/445, 444, 431, 438, 126/439, 449, 446, 447, 448, 450; 165/53, 54, 56

[56] References Cited

U.S. PATENT DOCUMENTS

| | | | |
|---|---|---|---|
| 1,258,405 | 3/1918 | Harrison | 126/438 |
| 2,625,930 | 1/1953 | Harris | 126/439 |
| 2,969,788 | 1/1961 | Newton | 126/439 |
| 3,929,122 | 12/1975 | Alkasab | 126/438 |
| 4,011,855 | 3/1977 | Eshelman | 126/438 |
| 4,016,861 | 4/1977 | Taylor | 126/438 |
| 4,020,827 | 5/1977 | Broberg | 126/438 |
| 4,059,094 | 11/1977 | de Mendoza | 126/439 |
| 4,098,019 | 7/1978 | Strong | 126/451 |
| 4,120,282 | 10/1978 | Espy | 126/438 |
| 4,144,871 | 3/1979 | Porter | 126/449 |

*Primary Examiner*—Daniel J. O'Connor

[57] ABSTRACT

A solar energy collecting wall or roof panel comprises a folded plate-type structural member capable of becoming an integral part of a building and incorporating a solar energy absorbent surface in heat-exchange relation with a fluid, the folded plate being configured to position the absorbent surface to optimize solar energy collection.

15 Claims, 22 Drawing Figures

FOLDED PLATE SOLAR ENERGY COLLECTOR

This invention relates to an improved wall or roof panel for use as a solar energy collector or in a solar energy collector system.

Solar wall or roof panels for collecting solar energy and using such collected energy to heat a suitable gas or liquid fluid which is then utilized to heat a building structure are well known in the art and already in use in various sections of the country. Typical solar collector panels should have a desired tilt angle with respect to the sun to optimize collection of sun rays. This has heretofore required that the panels to be mounted on sloped surfaces and be stiffened or reinforced to support the weight of large panel areas. As structural elements, the known panels are inefficient. Furthermore, such large sloped areas impose undesirable restrictions on building architectural design.

The present invention is directed to an improved panel structure that is compact, reasonably inexpensive to fabricate, yet effective in carrying out the functions desired of such a structure. Moreover, the improved panel structure of the invention is capable of becoming an integral part of a building, such as roofing, roof structure, or wall elements, which can be positioned vertically, horizontally, or at any angular position while yet maintaining optimum collector tilt angle and also providing an effective collector area equivalent to that of the known panels enclosing or covering the same horizontal area. Still further, the panels of the invention with integral collectors will make efficient structural load-carrying members.

According to the present invention, a wall or roof panel for use as a solar collector or in a solar collector system comprises a folded plate-type structural member. The folded structural member comprises at least one collector plate element connected along an edge to an adjoining connecting plate member, the edge connection, which forms the fold, supplying stiffness in the fold direction. When plural collector and connecting plate members are present, they alternate in a zing-zag manner. Each collector plate has an energy absorbing surface. The panel is provided with transparent wall portions spaced from the collector absorbing surface to insulate same from the outside ambiance, and to allow solar radiation to reach the collector absorbing surface. A fluid heat exchanger is associated with the collector plates to remove generated heat. When the panel is installed in a horizontal, vertical or other position, the collector plate can be oriented transversely to the incident solar radiation to optimize heat absorption. When plural collector plates are present, all can be located to provide this optimum orientation relative to the incident solar energy. The fluid heat exchanger can be associated with the collector plates in various configurations as will be hereinafter described.

The invention will be better understood from the following detailed description of several exemplary embodiments, taken in conjunction with the accompanying drawings, wherein.

Figure 1:
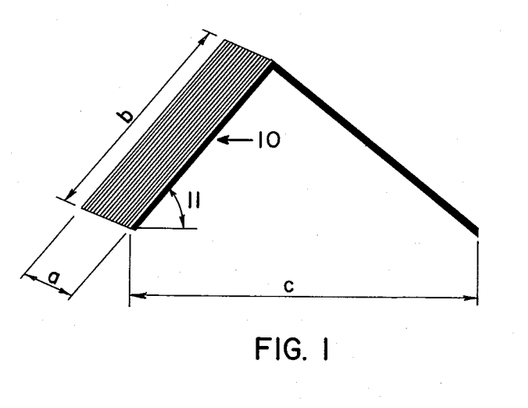
FIG. 1 schematically illustrates a prior art solar roof panel oriented for optimum utilization of incident solar energy.

Referring now to the drawings, FIG. 1 schematically illustrates a prior art solar panel mounted on the roof of a building structure to collect solar energy. The panel, designated 10, is mounted on the structure so as to occupy a desired tilt angle designated 11 relative to a horizontal plane. This tilt angle 11 is normally chosen so that the heat absorbing surface of the panel is transverse to incident sun rays. The effective collecting area of this embodiment is the surface area presented to the sun's rays, which surface area is the product of the width a and length b of the panel.

Figure 2:
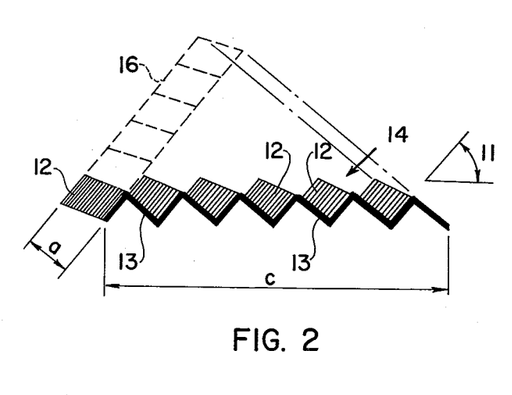
FIGS. 2-4 schematically illustrated folded collector wall or roof panels of the invention providing a collector area and orientation equivalent to that illustrated in FIG. 1.

Instead of making the solar panel as a sloped flat element as shown in FIG. 1, independent of the building structure and thus requiring direct support by the building structure, the solar panel of the present invention is configured as a self-supporting, folded-plate structurally stiff element, with the result that the panel can be designed as a structural load-bearing member to span over considerable distances without the need for additional supporting structure and thus can be integrated into the building design. Moreover, the total effective heat absorbing surface area presented to the sun's rays can be made equal to that of FIG. 1 panel covering the same horizontal area. This is illustrated in FIG. 2. The lined areas, designated 12, are heat-absorbing collector plates interconnected by connecting plates 13 to form a folded plate panel construction 14. Assuming each collector plate 12 has the same span a, and the total panel 14 has a horizontal length c corresponding to the span dimension c of FIG. 1, with the collector and connecting plates forming a right angle, then the folded plate configuration 14 of FIG. 2 will have the same effective collecting surface area as the panel of FIG. 1. This is illustrated by the projected area shown in dashed lines at 16 of the collector plates 12. Note that the collector plates 12 and connecting plates 13 are respectively parallel, and the collector plates 12 also have the same tilt angle 11. The roof geometry of FIG. 2 forms a folded plate structure which can be of lightweight construction, stiff, and thus span long distances without the use of intermediate supports.

Figure 3:
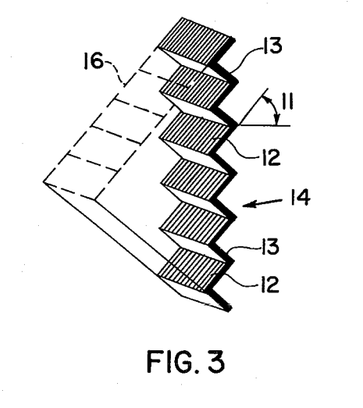
Figure 4:
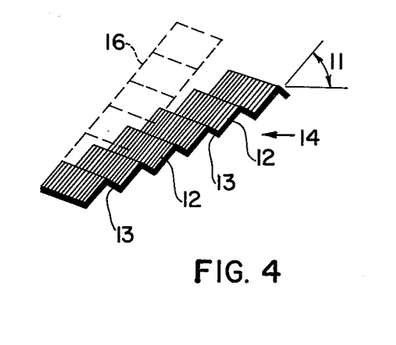

FIGS. 3 and 4 illustrate other orientations of the folded plate configuration which again provide the same collecting area as that of FIG. 1. The same reference numerals and letters are used to designate corresponding elements. FIG. 3 shows a vertical collector, whereas FIG. 4 shows an angularly positioned collector. Again, alternate plates are substantially parallel, the collector plates 12 have the same optimum tilt angle, and the dashed areas 16 illustrate the effective collecting area.

Figure 5:
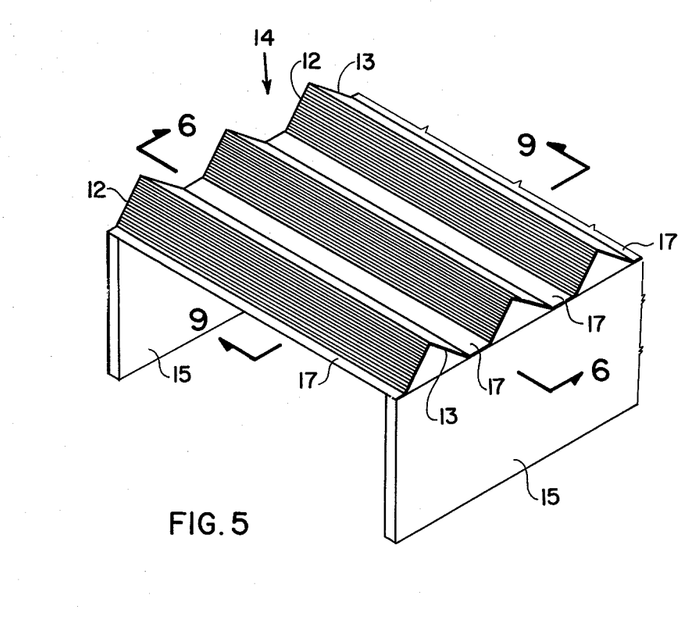
FIG. 5 is an enlarged schematic perspective view of a roof panel of the invention corresponding to the FIG. 2 embodiment.
Figure 9:
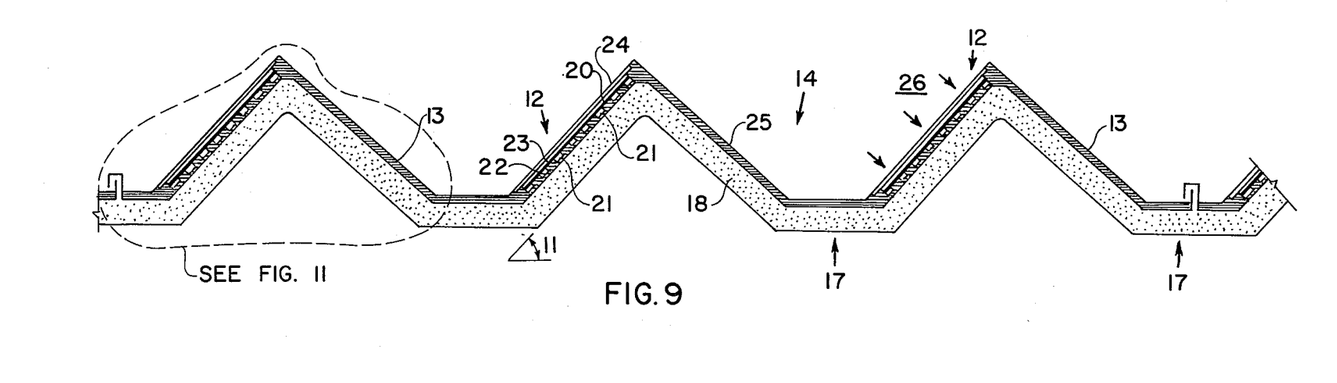
FIG. 9 is a partly cross-sectional view of the panel of FIG. 5 taken along the line 9—9 showing a first embodiment of the invention.

FIG. 5 is an enlarged perspective view illustrating the folded plate embodiment 14 of FIG. 2 used as a roof panel spanning between two walls. The panel 14 is a self-supporting structural element mounted on a supporting structure 15, which may be the usual building walls, beams or trusses, and spans the distance between the supports. The collector plates are designated 12, which alternate with connecting plates 13, which have horizontal edge portions 17 which are used for mounting on the support 15. FIG. 9 is a partly cross-sectional view of a first embodiment of the panel of FIG. 5. The collector plates 12 alternate in zig-zag manner with connecting plates 13 forming a multiple folded plate self-supporting structure backed up by an insulating support 18 to reduce undesired heat losses from the panel. The collector plates comprise a base member 20 having parallel passageways 21 for a heat-exchanging fluid, for example, air or water. The surface 22 of the base member is suitably treated, for example, by blackening, to provide high absorption for incident sun rays. Overlying the base member absorbing surface 22, but spaced therefom to provide an insulating air space 23, is a solar energy transparent wall section 24 which is mounted on the panel. The collector plate portions 20 may be, for example, of metal, and the transparent wall section 24 of glass. The glass window 24 helps preserve the heat-absorbing qualities of the surface 22, and also acts to insulate same from the outside ambiance. The connecting plates 13, which may also be of metal, interconnect alternate collectors 12 into an integral structural element. If desired, the external surface 25 of the connecting plates 13 may be made reflecting to redirect any sun rays toward the collector plates 12, which are the effective solar collectors of the panel. The zig-zag structure shown has increased stiffness over a flat plate in the direction of the folds, which is a direction perpendicular to the drawing plane.

In operation, solar rays designated 26 pass through the glass window 24 and are absorbed by the absorbing surfaces 20 of the collector plates 12 raising their temperature. Fluid is flowed through the passageways 21 and the heat in the collector plate is transmitted to the fluid. As is well known, the heated fluid can then be used in various ways for supplying heat to the building structure. For example, the heat in the fluid can be stored in various reservoirs and used during colder parts of the day. If the fluid is air, it can be directly passed through the living quarters of a house to warm same. If of water, the heated water can be circulated through various radiators.

Figure 6:
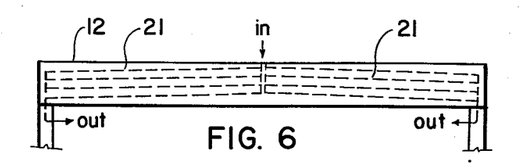
FIGS. 6 and 7 are views along the line 6—6 of FIG. 5 which schematically illustrate several configurations for heat-exchange fluid flow through the panel of FIG. 5.
Figure 7:
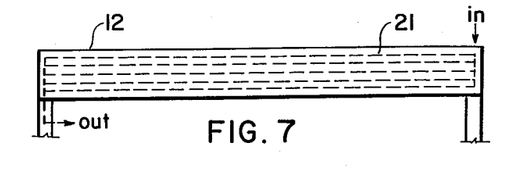
Figure 8:
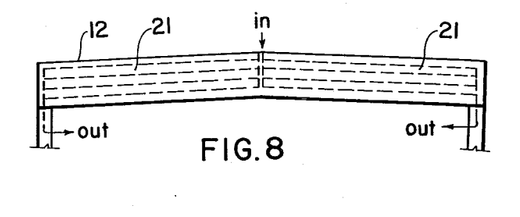
FIG. 8 shows modified fluid flow for a haunched folded plate modification of FIG. 5.

FIGS. 6–8 depict several ways in which fluid can be distributed through the passageways 21 in each collector plate 12. For instance, in FIG. 6, the fluid can be inlet at the center, and it would gravity flow through sloping passageways 21 to opposite dual outlets. In this case, the collector 12 can be level or horizontal. In FIG. 7, the passageways 21 can be horizontal, but the entire panel 12 sloped to provide gravity flow from a single inlet at the higher end to a single outlet at the lower end.

In FIG. 8, the panel 12 can be haunched with passageways 21 parallel to the panel slopes. A common center inlet feeds dual outlets at the ends.

Figure 10:
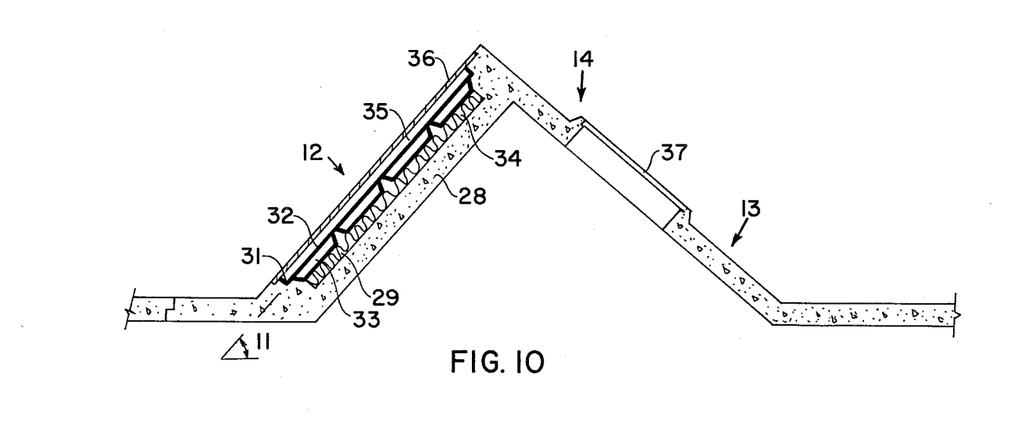
FIG. 10 is a view similar to FIG. 9 of a second embodiment of the invention.

FIG. 10 shows a second embodiment of the panel, which differs from FIG. 9 in that it can be used for long span roofs for industrial plants and gymnasiums, for example. It also may consist, as shown, of only one fold. In this case, the main structural part 28 is made of concrete, which is recessed to form a cavity 29 where the collector plate 12 is incorporated. In this embodiment, a base member 31 of metal having an absorbent surface 32 is provided with larger passageways 33 suitable for conveying gas or air. Insulation for the back side is provided at 34, and for the front side by the dead air space 35 and glass window 36. This embodiment also illustrates how optional light transparent windows 37 can be incorporated in the connecting plate portion 13 of the panel.

Figures 11, 12, 13:
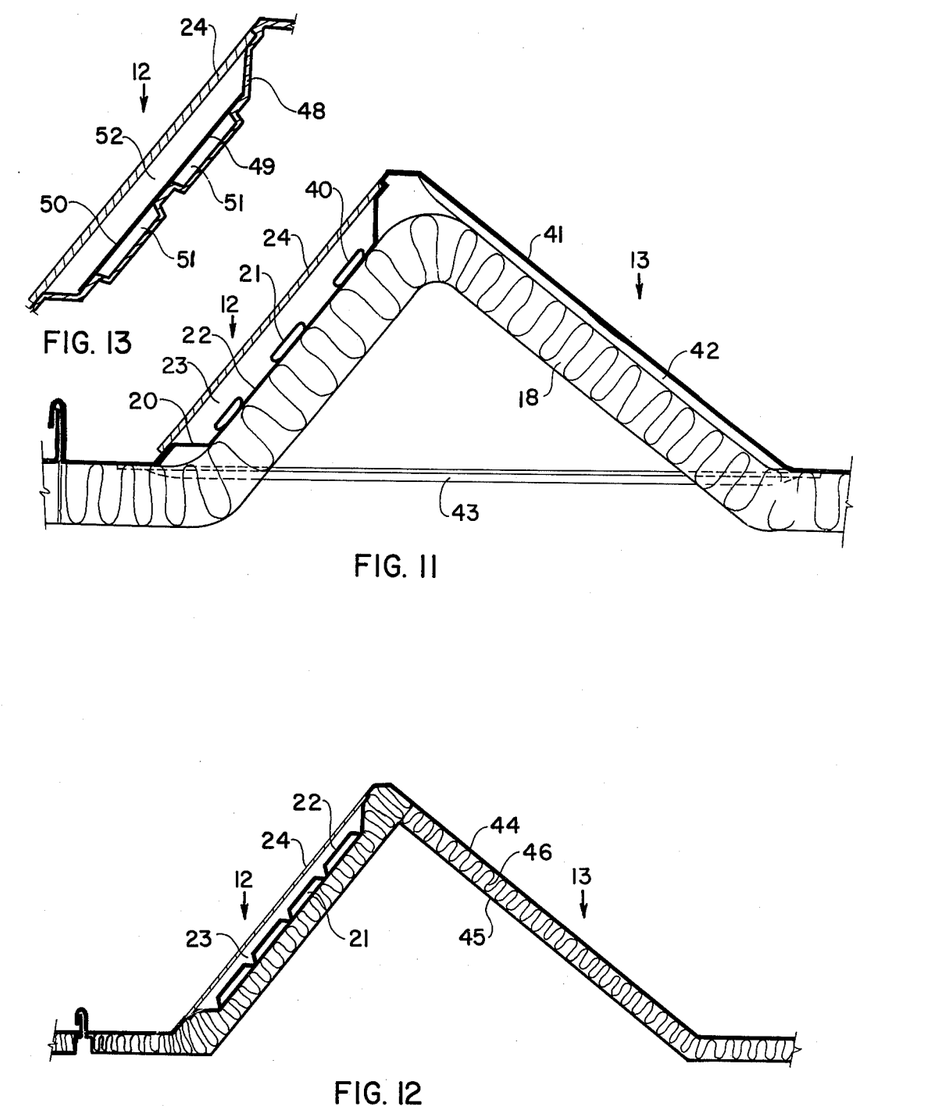
FIG. 11 is an enlarged detail view of one folded section of the panel of FIG. 9.
FIG. 12 is a view similar to FIG. 11 of still a further design intended for longer spans.
FIG. 13 is a view similar to FIG. 11 of an alternate design of the collector plate.

FIG. 11 is an enlarged detail view of the dashed outlined region of the FIG. 9 embodiment. The collector plates 20 may be metal, with the liquid passageways 21 formed by metal tubes 40 fastened thereto. The structural part 41 of the connecting plate 13 can also be of metal, or of plastic, provided if desired with secondary corrugations 42 for transverse stiffness. The bars 43 can be provided to stiffen the panels in directions perpendicular to the span before installation, and removed if desired after installation, or left in place.

FIG. 12 shows a modification for a longer span which uses a double skin construction, an outer shell 44 and an inner shell 45, bonded to core material 46 to form the structural element.

FIG. 13 shows still a further modification of the collector plate construction. In this case, the structural element is formed by a plate-like element 48 in a cavity of which is laminated a collector plate 49 with absorbent surface 50 forming passageways 51 for air flow. Alternatively, the passageways 51 can be omitted and the air circulated through the space 52 formed between the glass window 24 and the collector plate 50.

Figure 14:
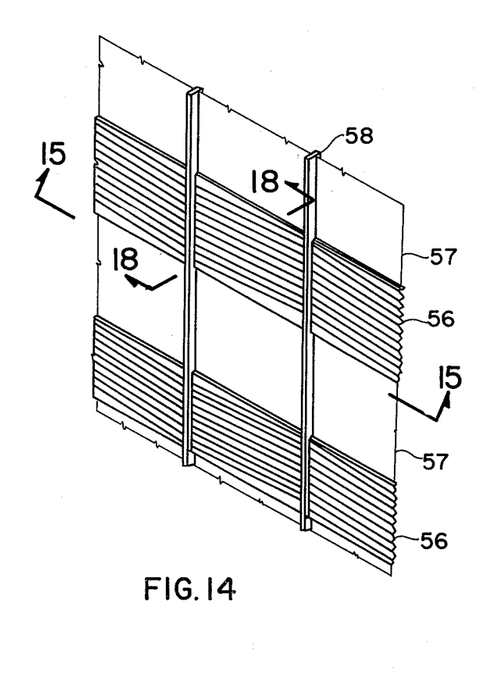
FIG. 14 schematically illustrates a wall panel embodying the invention for a typical curtain wall construction.
Figure 15:
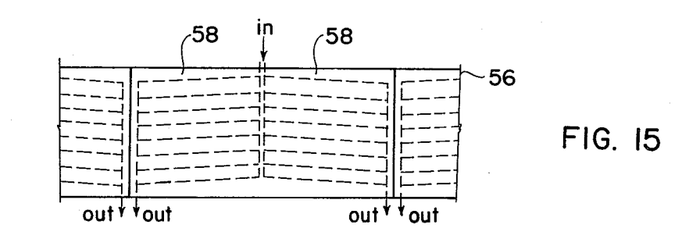
FIGS. 15-17 illustrate schematically three different modes of heat-exchange fluid flow through the panels of FIG. 14.
Figure 16:
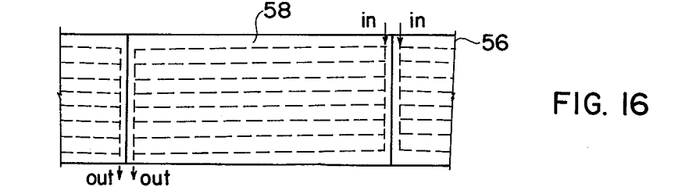
Figure 17:
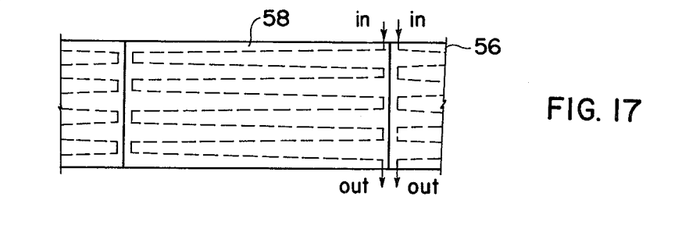

FIG. 14 shows a schematic arrangement of a folded plate panel for a typical curtain wall construction. The solar panels are designated 56, and are separated by transparent window sections 57. Vertical feed members 58 provide stiffening, and end supports for panels 56. FIGS. 15–17 illustrate, analogously to FIGS. 6–8, how fluid can be flowed through the panel sections 56. In FIG. 15, two-way sloped passageways 58 are provided with a single inlet and dual outlets. In FIG. 16, one-way sloped flow with single inlet and outlet per panel is illustrated. FIG. 17 is similar to FIG. 16, except S-shaped flow is used allowing the inlet and outlet to be at the same side.

Figures 18, 19:
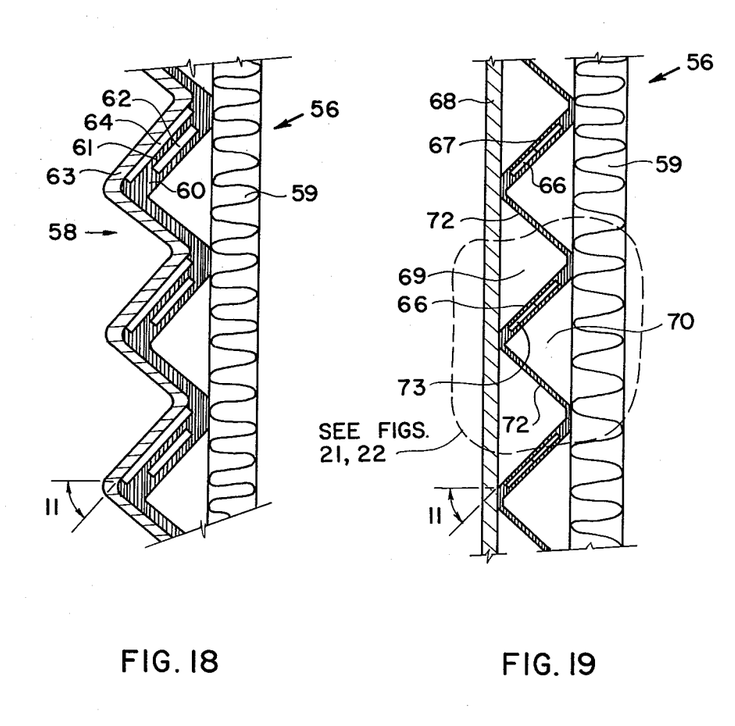
FIGS. 18-20 are views analogous to the partly cross-sectional views of FIGS. 11-13 showing various additional embodiments of a panel according to the invention for wall use.
Figure 20:
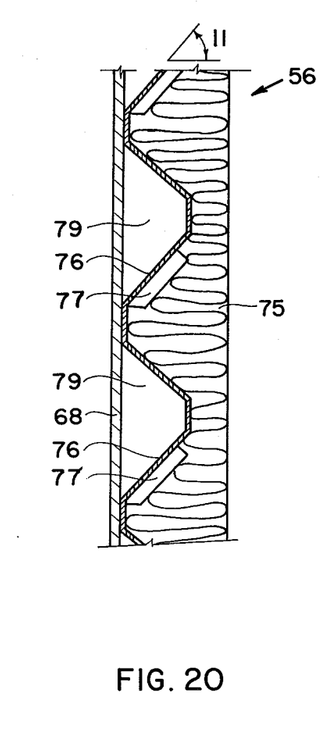

FIGS. 18–20 are partly schematic, partly cross-sectional views of three different forms of solar panel constructions for use as a wall section. All three panels 56 are stiffened by the structural behaviour of the folded multiple plate collectors. In FIG. 18, a flat insulating backing member 59 is bonded to the folded plate 58 at alternate folds as shown. The collector plates are designated 60, with absorbent surfaces 61. Passageways for fluid are provided at 62. A glass layer 63 is shaped to follow the zig-zag shape of the folded plate, providing insulated air spaces at 64. The member 59 can serve only an insulating function for the solar panel with the latter contributing the main structural support, or the member 59 can be provided with some stiffness to contribute strength to the combined structure. In the latter case, both the folded plate 58 and the member 59 can contribute to carrying out load-bearing functions.

In FIG. 19, the collector plates are at 66, with absorbent surfaces 67. The glass plate 68 is here flat, providing air spaces at 69. The connecting plate surfaces at 72 may be made reflecting to redirect any sun rays to the absorbent surfaces 67. Liquid fluid passageways are shown at 73. As an alternate, the fluid passageways 73 can be eliminated and fluid circulated through spaces 69 and 70.

In FIG. 20, the backing member 75 is configured to follow the contour of the folded plate. The absorbent surfaces are at 76, and air passageways provided at 77. Alternatively, the air passages 77 can be omitted and the spaces at 79 used for circulating air to remove the absorbed heat energy.

Figure 21:
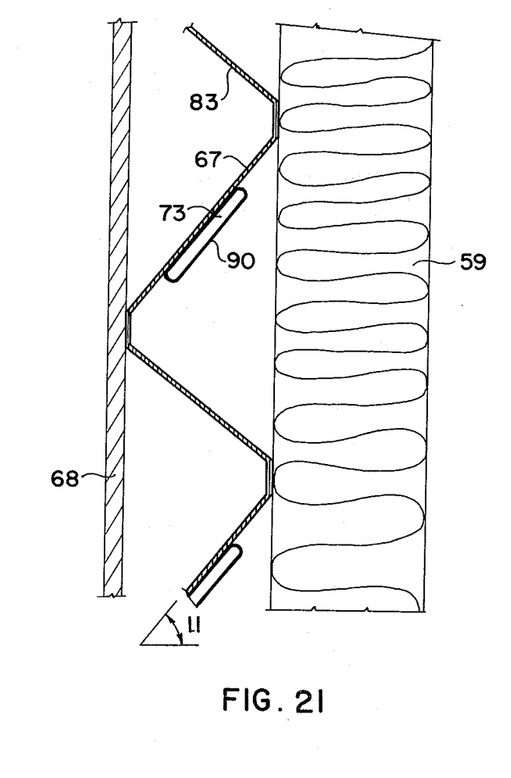
FIG. 21 is an enlarged detail view of part of the panel of FIG. 19.
Figure 22:
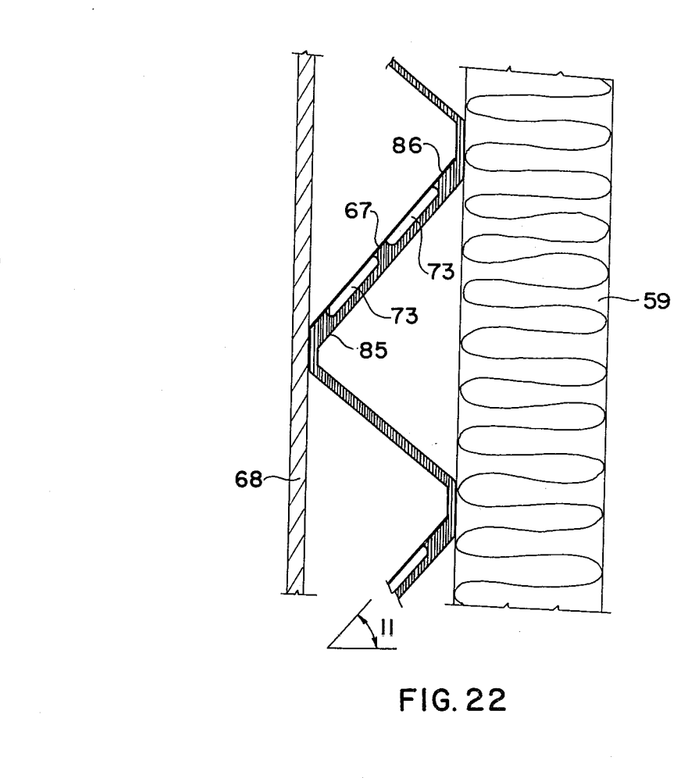
FIG. 22 is a view similar to FIG. 21 of a further modification.

FIGS. 21 and 22 show enlarged detail views of two modifications of the FIG. 19 embodiment. In FIG. 21, the folded plate may be of steel or aluminum, and the passageways formed by flat aluminum or copper tubing 90 bonded to the collector plates. The surface at 67 is darkened to be energy absorbent, and the surface at 83 may be reflectorized as previously described.

In FIG. 22, the folded plate 85 may be of laminated plastic, and the collector plates 86, of brass or aluminum, laminated thereto over recesses 73 to form the fluid passageways. The absorbent surfaces are at 67.

The advantages of this invention include the following:

1. Integration of structure and solar collection into one system, where the need for an optimum solar panel collector angle is utilized for developing a stiff folded plate structure.

2. The resulting folded plate solar collector can be utilized in horizontal, vertical, or at any angular position while maintaining optimum collector angle for collector surfaces.

3. The stiffness and structural strength of the system permits elimination of secondary supporting structure otherwise required for conventional solar collectors.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A wall or roof panel for use in a building as a solar collector or in a solar collector system, comprising a folded plate-type structural member composed of at least one collector first plate element and at least one connecting second plate element alternatively arranged in substantially zig-zag manner with each collector first plate connected at one edge to the adjoining connecting second plate or at opposite edges to alternate second plates when present, the connecting second plates when more than one is present extending in substantially parallel planes and the collector first plates when more than one is present extending in substantially parallel planes oriented at substantially the same tilt angle with respect to the planes of the second plates whereby all of the collector first plates present can be positioned transverse to incident solar energy when the wall or roof panel is mounted in operating position for optimizing the collector plate angle with relation to incident solar energy, the edge connections between collector first plate elements and connecting second plate elements forming the folds and providing structural strength of the panel in the direction parallel to the length of the folds, said panel having at least one wall portion transparent to solar energy, each of the collector first plates being insulated from the outside ambiance by said transparent wall portions and being energy absorbent, said collector first plates being in heat-exchange relationship with a fluid-conveying structure in the panel whereby solar energy when incident on said transparent wall portions will be transmitted therethrough to be absorbed by the absorbent collector first plate elements and absorbed heat transferred to fluid passed through the fluid-conveying structure, said folded plate structural member and said edge connections between connecting first and second plate elements forming a stiffened integral structure which is substantially self-supporting and capable of functioning as a load-bearing solar-energy-receiving structural element when installed in said operating position as an integral wall or roof panel of a building.

2. A wall or roof panel as claimed in claim 1, wherein each collector first plate comprises a metal member whose surface facing the transparent wall portion is spaced from the latter and is treated to enhance solar energy absorption.

3. A wall or roof panel as claimed in claim 2, wherein the outer surfaces of the connecting second plates are reflective for solar energy.

4. A wall or roof panel as claimed in claim 1, wherein the panel comprises an insulating support member integrally connected to the folded-plate member.

5. A wall or roof panel for use in a building in a solar collector system, comprising an elongated folded plate structural member composed of at least one collector first plate element and at least one adjoining connecting second plate element alternately arranged in a substantially zig-zag manner, structural means connecting together the adjacent edges of each collector first plate with the adjoining connecting second plate, the plane of the collector first plate extending at a predetermined tilt angle with respect to the plane of the second plate whereby the collector first plate can be located transverse to impinging solar energy when the panel is mounted in operative position, said collector first plate having an areal portion absorbent of solar energy and a wall transparent to solar energy mounted in front of the absorbent portion, means for heat insulating the absorbent portion from ambient temperature, and means providing fluid flow across the collector first plate and in heat-exchange relationship with the absorbent portion, whereby solar energy when impinging on said transparent wall will be transmitted therethrough to be absorbed by the absorbent portion which in turn transfers heat to the fluid passing across the collector first plate, said folded plate structural member and said edge connections between connecting first and second plate elements forming a stiffened integral structure which is substantially self-supporting and capable of functioning as a load-bearing solar-energy-receiving structural element when installed in said operative position as an integral wall or roof panel of a building.

6. A wall or roof panel as claimed in claims 1 or 5, wherein the fluid flow is provided through a space formed between the absorbent portion and the heat insulating portion.

7. A wall or roof panel as claimed in claims 1 or 5, wherein at least one tube is bonded to the absorbent portion, and the fluid is passed through the tube.

8. A wall or roof panel as claimed in claim 5, wherein the panel comprises a backing member, and insulation is provided between the absorbent portion and the backing member.

9. A wall or roof panel as claimed in claim 5, whrein the panel comprises a backing member having at least one cavity, and the collector first plate is mounted within the cavity.

10. A wall or roof panel as claimed in claim 5, wherein the panel comprises a flat insulating member which is mounted on the folded plate at its inner folds.

11. A wall or roof panel as claimed in claim 10 wherein the transparent member comprises a flat plate mounted on the folded plate at its outer folds.

12. A wall or roof panel as claimed in claim 5, wherein the folded plate comprises plural first plates and plural second plates and the resultant panel is stiffened by the folded zig-zag configuration.

13. A wall or roof panel as claimed in claim 12, wherein the panel comprises a stiff structural member free of secondary supporting structure.

14. A building having a wall or roof panel as claimed in claims 1 or 5, and means for introducing the removing fluid from said panel.

15. A wall or roof panel as claimed in claims 1 or 5, wherein the panel comprises a locking member bonded to the folded plate and contributing to its load-bearing function.

* * * * *